Dec. 31, 1963  W. JURISCH  3,115,780
CONVERTING DEVICE
Filed July 20, 1960
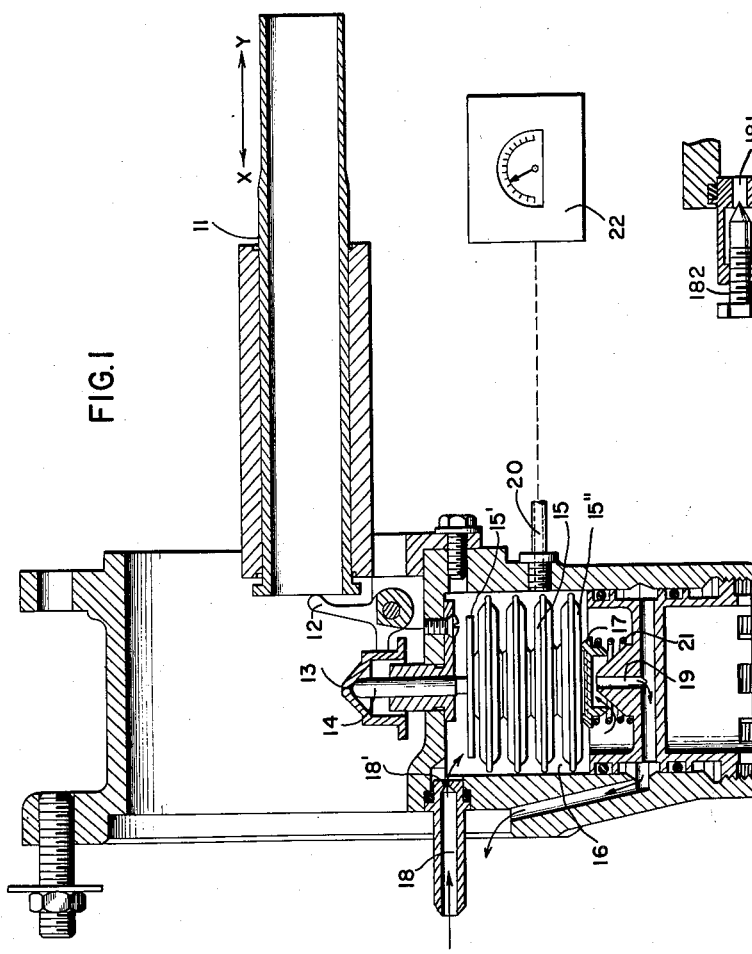
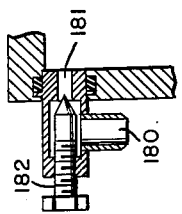
INVENTOR
WILHELM JURISCH
BY *Dicke, Craig & Freudenberg*
ATTORNEYS > # 3,115,780
> Patented Dec. 31, 1963

3,115,780
CONVERTING DEVICE
Wilhelm Jurisch, Stuttgart-Sillenbuch, Germany, assignor to Daimler-Benz Aktiengesellschaft, Stuttgart-Unterturkheim, Germany
Filed July 20, 1960, Ser. No. 44,086
Claims priority, application Germany Aug. 18, 1959
11 Claims. (Cl. 73—388)

The present invention relates to a device for converting an adjusting movement into a variation of pressure, and more particularly, for converting an adjusting movement indicative of a variation in a magnitude, for example, a variation in the torque of a shaft, into a corresponding variation in the pressure of a fluid medium, preferably of a hydraulic medium.

The purpose of the present invention essentially consists in creating an arrangement or mechanism for converting adjusting movements into pressures, pneumatic or preferably of hydraulic nature, which are suitable or utilizable for controlling or measuring purposes. The adjusting movements which are introduced into the mechanism of the type in question, may result or be derived from any other known mechanism or installation connected ahead thereof, which may serve, for example, for purposes of determining the torque of an output or work-producing shaft. Arrangements of the last-mentioned type ordinarily essentially consist, in the main, of a torsion rod which is included in the force transmission path and which is torsionally stressed by the prevailing torsion rod. The angular displacements resulting therefrom, which may be converted into a linear movement in any suitable known manner, thereby supply the adjusting movements which serve for purposes of actuating the mechanism in accordance with the present invention.

The arrangement according to the present invention is characterized by a fluid circulatory system, preferably by a hydraulic circulatory system, maintained under constant predetermined pressure in which an elastically effective control member, for example, a pressure box such as barometric cells are included which pressure box is actuated as a result of the introduced adjusting movements and is placed under different pre-stresses whereby it blocks temporarily the hydraulic circulatory system for such length of time until the prevailing pre-stress of the pressure cells is attained or overcome by a hydraulic counter-pressure which builds up as a result thereof, which, in turn, lifts the blocking effect of the pressure cells and simultaneously therewith serves as measuring magnitude.

In order to indicate, for example, to the pilot of an airplane provided with a propeller-drive driven by an output-producing gas turbine drive unit, the torque prevailing at the propeller drive-shaft, the afore-mentioned prevailing hydraulic counterpressure is transmitted as measuring magnitude over lines or conduits to a calibrated pressure instrument which supplies in percentage values a measure for the torque produced at the propeller of the airplane.

The installation according to the present invention is simple and inexpensive in structure, whereby the hydraulic circulatory system used in the mechanism according to the present invention may be readily connected with an already present oil pressure circulatory system which already forms a requisite part of the engine or drive unit to which the mechanism in accordance with the present invention is coordinated.

Accordingly, it is an object of the present invention to provide a converting arrangement for converting the adjusting movements representing a variable magnitude of mechanical nature into variations in pressure which obviates the deficiencies of the prior art devices and which is simple in construction and relatively inexpensive in manufacturing and assembly costs.

Still another object of the present invention resides in a converting device which readily converts mechanical adjusting magnitudes into variations of pressure of a fluid medium whereby the resulting variations in the pressure of the fluid medium correspond to the mechanical adjusting magnitudes and can be readily measured by means of a calibrated instrument.

A further object of the present invention resides in the provision of a converting arrangement for converting mechanical adjusting magnitudes into variations in the pressure of a fluid medium which utilizes a circulatory system for the fluid medium that may be readily interconnected with the already present circulatory system of the apparatus of which a magnitude is measured.

These and other objects, features and advantages of the present invention will become more obvious from the following description when taken in connection with the accompanying drawing which shows in FIGURE 1 thereof, for purposes of illustration only, one embodiment in accordance with the present invention, and in FIGURE 2 a modification of the embodiment of FIGURE 1.

Referring now to FIGURE 1 which shows a cross-sectional view through a converting arrangement in accordance with the present invention, reference numeral 11 designates an adjusting sleeve or rod adapted to be adjusted in the direction of oppositely directed arrows X—Y in dependence on the measured magnitude, for example, in dependence on the torque of the propeller drive shaft of a propeller driven airplane, as described hereinabove. Any adjusting movement of the adjusting sleeve 11 in the direction of arrow X is thereby transmitted to a bell crank or angle lever 12 which, in turn, actuates a pressure pin 14 by means of a pressure cap 13. The pressure pin 14 is secured at one end face 15' of pressure box, for instance, consisting of a number of pressure cells or barometric cells 15, accommodated within a pressure chamber 16. A valve 17 is arranged at the opposite, other end face 15" of the pressure box 15.

An inlet line 18 discharges into the pressure chamber, which inlet line 18 is interconnected with a hydraulic pressure circulatory system of any suitable type. The orifice 18' in the inlet line 18 is constituted by a bore of relatively small diameter in order to maintain as small as possible the flow quantities through the pressure chamber 16 so that only small strokes of the valve 17 which are essentially inconsequential occur at the outlet or discharge aperture of the outlet or discharge line 19. The size of the bore for orifice 18' may be made adjustable as illustrated in FIGURE 2 wherein needle valve 182 adjusts the size of the bore in orifice 181 which corresponds to the orifice 18' of FIGURE 1. The orifice 181 discharges from the inlet line 180.

*Operation*

The operation of the installation in accordance with the present invention is as follows.

If the adjusting sleeve 11 moves in the direction of arrow X, then the closure valve 17 is forced by means of bell crank 12, pressure cap 13 and pressure pin 14 against the valve seat thereof whereby the discharge line 19 is closed. As a result thereof, the pressure prevailing in the pressure chamber 16 increases which counteracts the pre-stress to which the pressure cells 15 are subjected by pressure pin 14 and does so for such length of time until the closure valve 17 is again slightly lifted so that the hydraulic medium now is able to flow off through discharge line 19. An equilibrium now exists again between the pre-stress, i.e., between the internal forces of the pressure cells 15 and the hydraulic counterpressure in pressure chamber 16 which, insofar as no new adjusting movement is initiated or introduced at the adjusting sleeve 11, remains constant. The flow quantity through the pressure chamber 16 thereby always remains the same.

The hydraulic counterpressure is transmitted through the connecting line 20 to a measuring indicator 22 of any known construction which is suitably calibrated and indicates, for example, to the pilot in the cockpit of an airplane provided with a propeller drive by means of an output-producing gas turbine drive unit, the torque prevailing at the propeller drive shaft.

Adjusting movements of the adjusting sleeve 11 in the direction of arrow Y, obviously effectuate a decrease of pressure in the chamber 16, since the pre-stress of the pressure box 15 is reduced thereby. A spring 21 maintains at all times a play-free contact between the pressure box 15, on the one hand, and all of the transmitting members 14, 12 and 11, on the other.

While I have shown and described one embodiment in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. An arrrangement for converting variable adjusting movements between two elements into corresponding pressure variations adapted to be used for controlling or measuring purposes, comprising pressure fluid circulatory means maintained under essentially constant pressure and including a pressure chamber, elastic and compressible pressure-responsive control means arranged within said pressure chamber, said pressure chamber including inlet means and outlet means interconnected in said pressure fluid circulatory control means, and valve means arranged at one end of said pressure responsive control means for selectively valving said outlet means, said control means selectively controlling the actuation of said valve means to control the flow of fluid through said circulatory means and the pressure within said chamber, and means for selectively actuating and thereby subjecting said control means to different pre-stresses corresponding to said adjusting movements to thereby close said valve means in the circulatory means for such length of time until the counterpressure developed thereby within said chamber and acting on said control means builds up to such an extent as to attain the pre-stress of said control means to thereby effectively annul the valve closing effect of said control means and simultaneously serve as measuring magnitude.

2. An arrangement according to claim 1, wherein said control means is a pressure box including a plurality of barometric cells.

3. An arrangement for converting the adjusting movements into pressure variations according to claim 1, further comprising connecting means operatively connected with said pressure chamber for transmitting the prevailing pressure within said pressure chamber to an indicating device calibrated to indicate variations in said pressure.

4. An arrangement for converting the adjusting movements into pressure variations according to claim 1, wherein said inlet means is provided with throttling means of relatively slight diameter.

5. An arrangement for converting the adjusting movements into pressure variations according to claim 4, wherein said throttling means is adjustable to adjust the amount of flow of the hydraulic medium which is constant through said pressure chamber.

6. An arrangement for converting the adjusting movements into pressure variations according to claim 1, wherein said actuating means includes pin means operatively connected with the end of said pressure-responsive control means opposite said valve means, said pressure chamber including housing wall portions, and said pin extending through one housing wall portion.

7. An arrangement for converting the adjusting movements into pressure variations according to claim 6, wherein said actuating means further includes angle lever means actuated by said adjusting movements and a pressure cap operatively interposed between said angle lever means and said pin.

8. An arrangement for converting the adjusting movements into pressure variations according to claim 7, further comprising spring means operatively connected with said first-mentioned end of said pressure-responsive control means for biasing said valve means against said control means.

9. An arrangement for converting variable adjusting movements between two elements into corresponding pressure variations adapted to be used for controlling or measuring purposes, comprising pressure fluid circulatory means having a pressure chamber and pressure-responsive control means in said presure chamber responsive to the pressure of the fluid medium of said circulatory means for selectively controlling the flow of said fluid medium in said chamber, said control means including pressure cell means and valve means operatively connected with said cell means, said circulatory means including inlet means leading into said pressure chamber and outlet means leading away from said pressure chamber, said valve means effectively valving said outlet means, and actuating means for selectively subjecting said pressure cell means to different pre-stresses corresponding to the adjusting movements to thereby selectively control actuation of said valve means and the flow of said fluid medium in said circulatory means for such length of time until the counterpressure developed within said chamber and acting on said pressure cell means changes to such an extent as to balance the prevailing pre-stresses of said pressure cell means and thereby effectively annul said pre-stresses whereby the pressure of said fluid medium simultaneously serves as measuring magnitude.

10. An arrangement for converting the adjusting movements into corresponding pressure variations according to claim 9, wherein said actuating means includes a pressure pin acting against one end of said pressure cell means, and angle lever means operatively connected with said pressure pin actuated by said adjusting movements.

11. An arrangement for converting the adjusting movements into corresponding pressure variations according to claim 10, further comprising spring means operatively engaging the opposite end of said pressure cell means to normally urge the same in a direction opposite that of the force resulting from said pre-stress.

References Cited in the file of this patent

UNITED STATES PATENTS

| | | |
|---|---|---|
| 2,451,451 | Tate | Oct. 12, 1948 |
| 2,599,159 | Breedlove | June 3, 1952 |
| 2,742,916 | Side | Apr. 24, 1956 |
| 2,883,995 | Bialous et al. | Apr. 28, 1959 |
| 2,939,122 | Wernlund | May 31, 1960 |